July 17, 1962

J. K. BRUCE 3,044,638

SELECTING AND TRANSFER APPARATUS FOR CONVEYING ARTICLES

Filed Nov. 9, 1959

INVENTOR.
JOHN K. BRUCE
BY
Christie, Parker & Hale
ATTORNEYS

INVENTOR.
John K. Bruce
BY Christie Parker Hale
ATTORNEYS

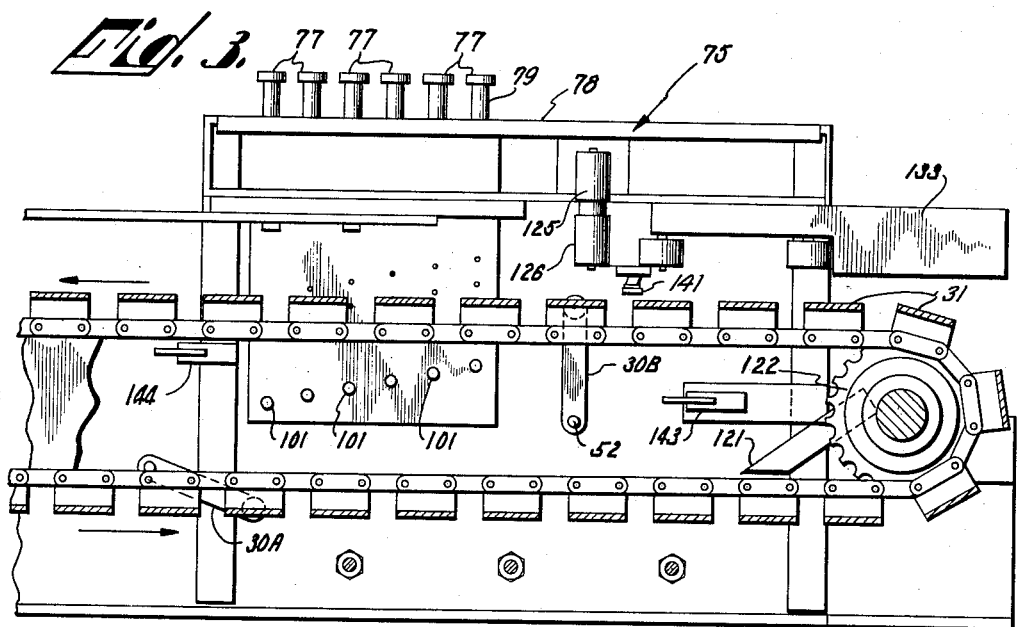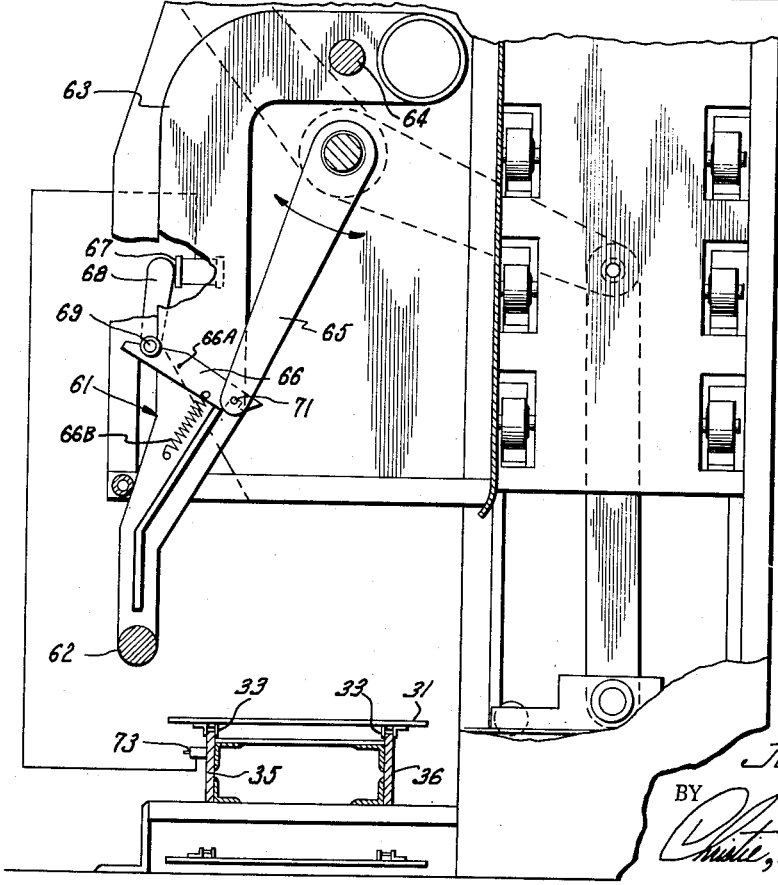

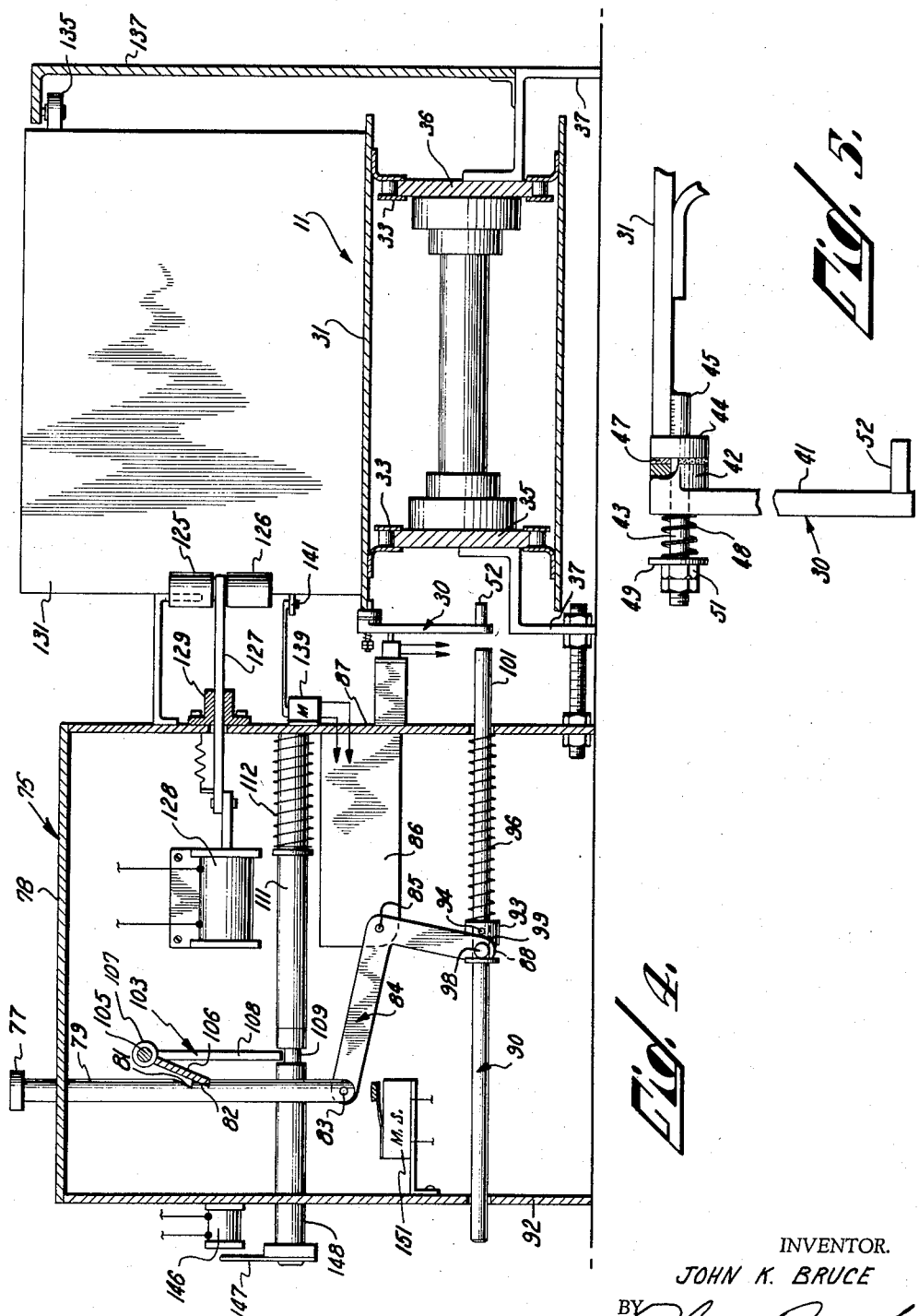

July 17, 1962   J. K. BRUCE   3,044,638
SELECTING AND TRANSFER APPARATUS FOR CONVEYING ARTICLES
Filed Nov. 9, 1959   10 Sheets-Sheet 5
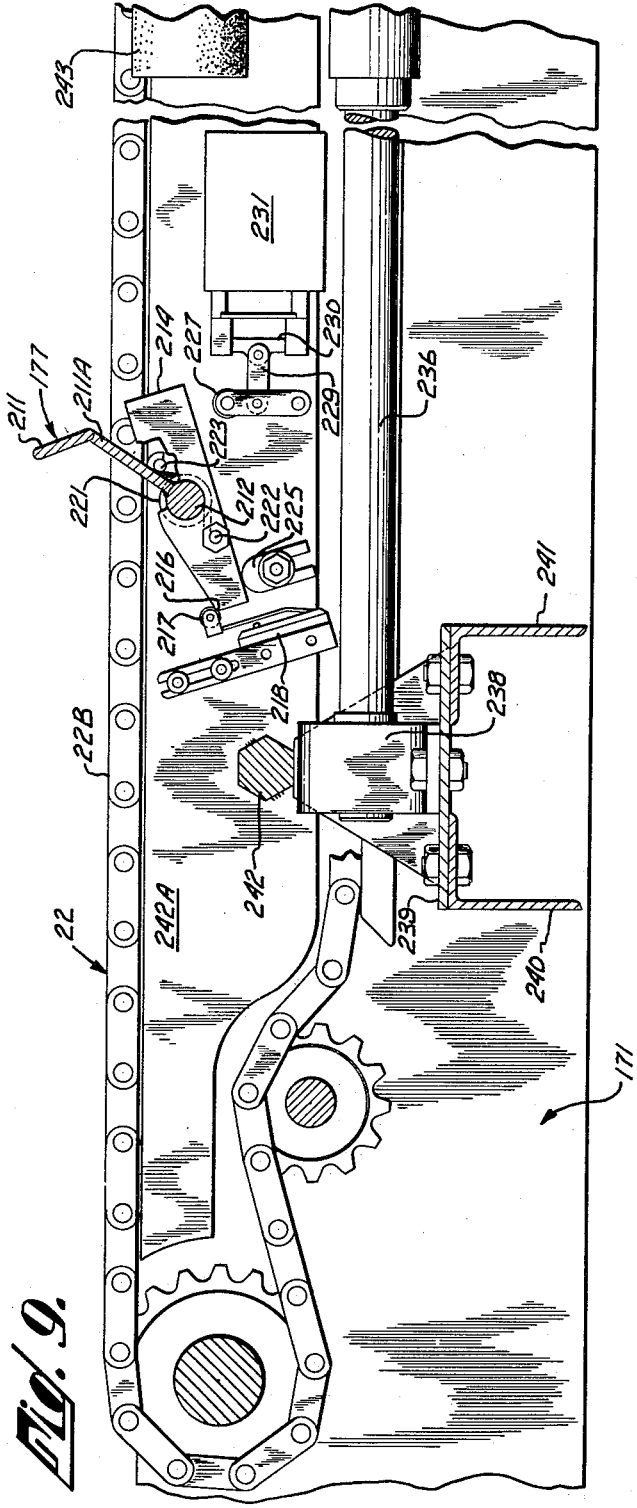
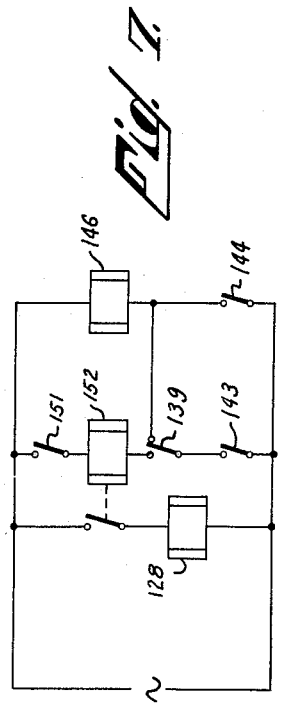
INVENTOR.
JOHN K. BRUCE
BY
Christie, Parker & Hale
ATTORNEYS

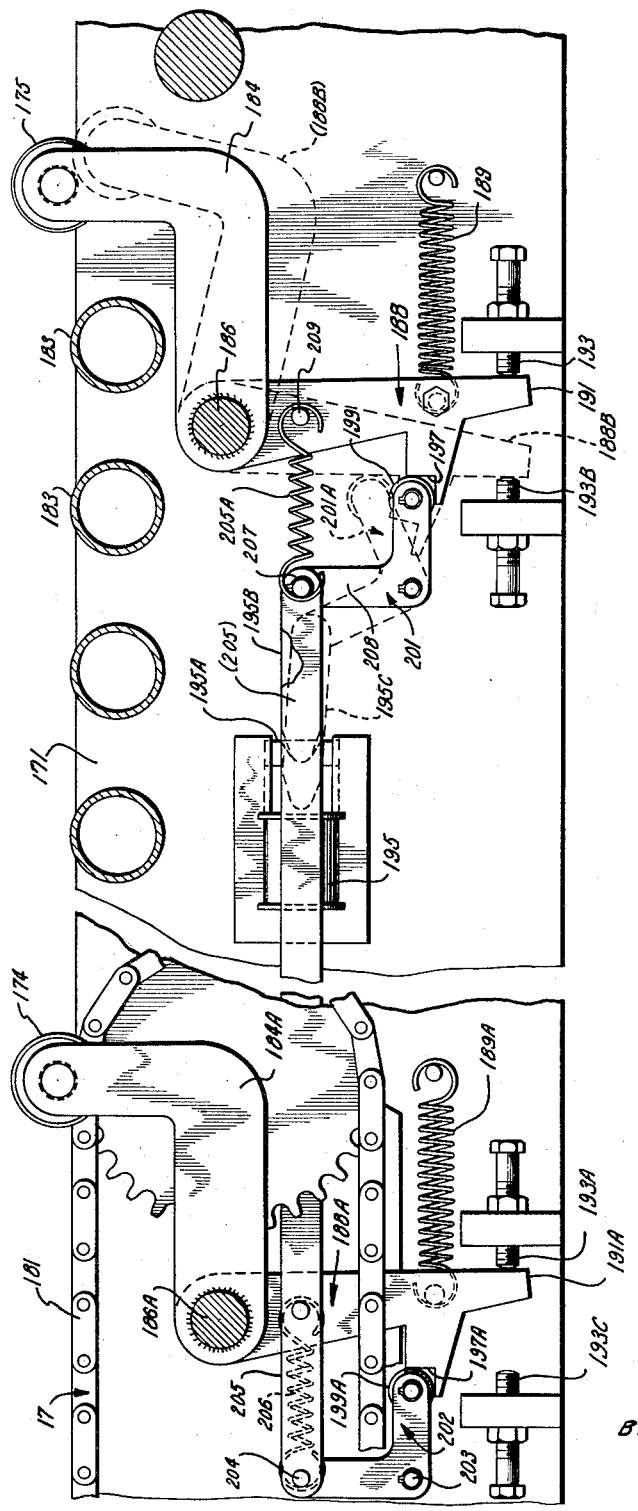

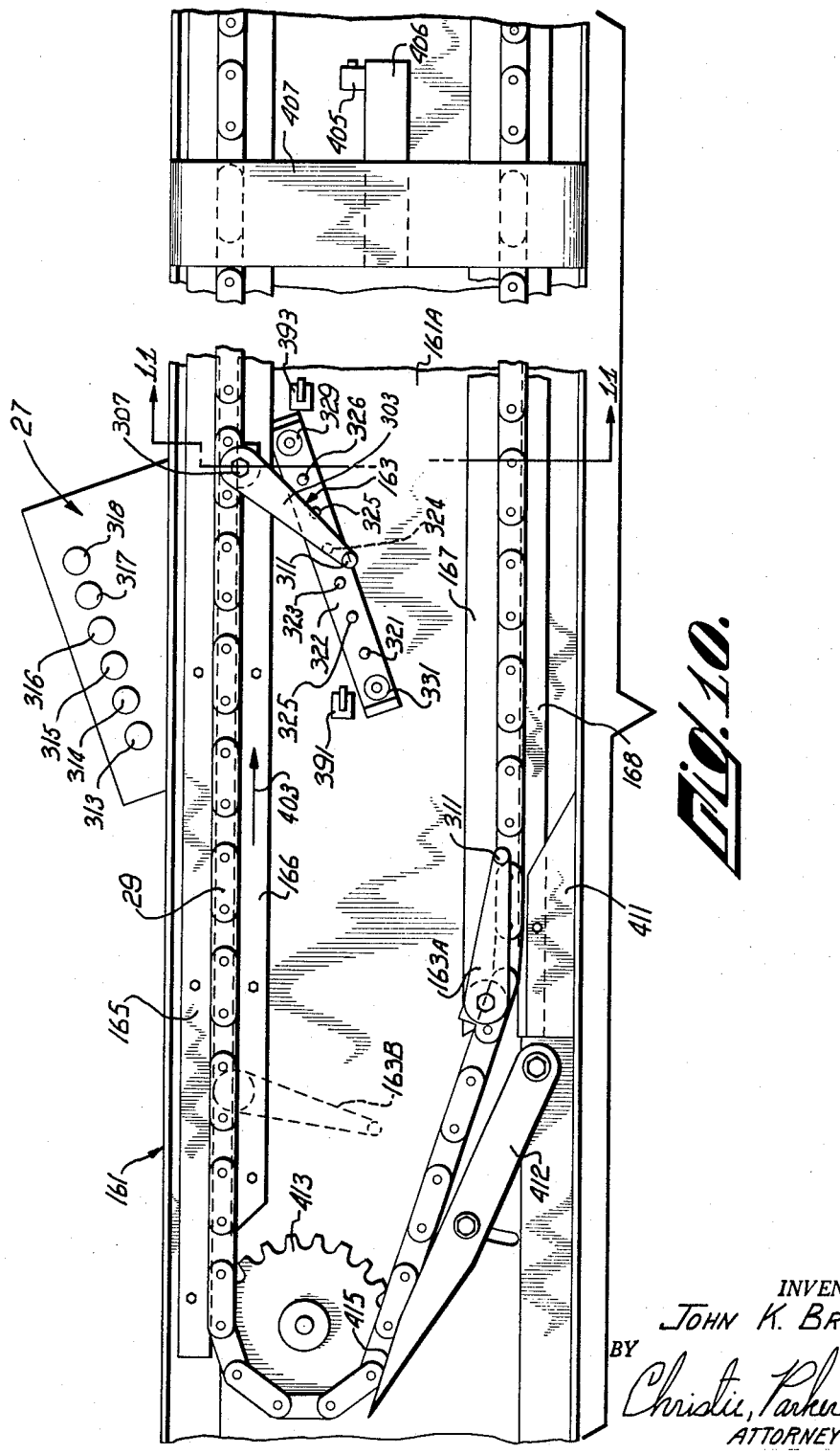

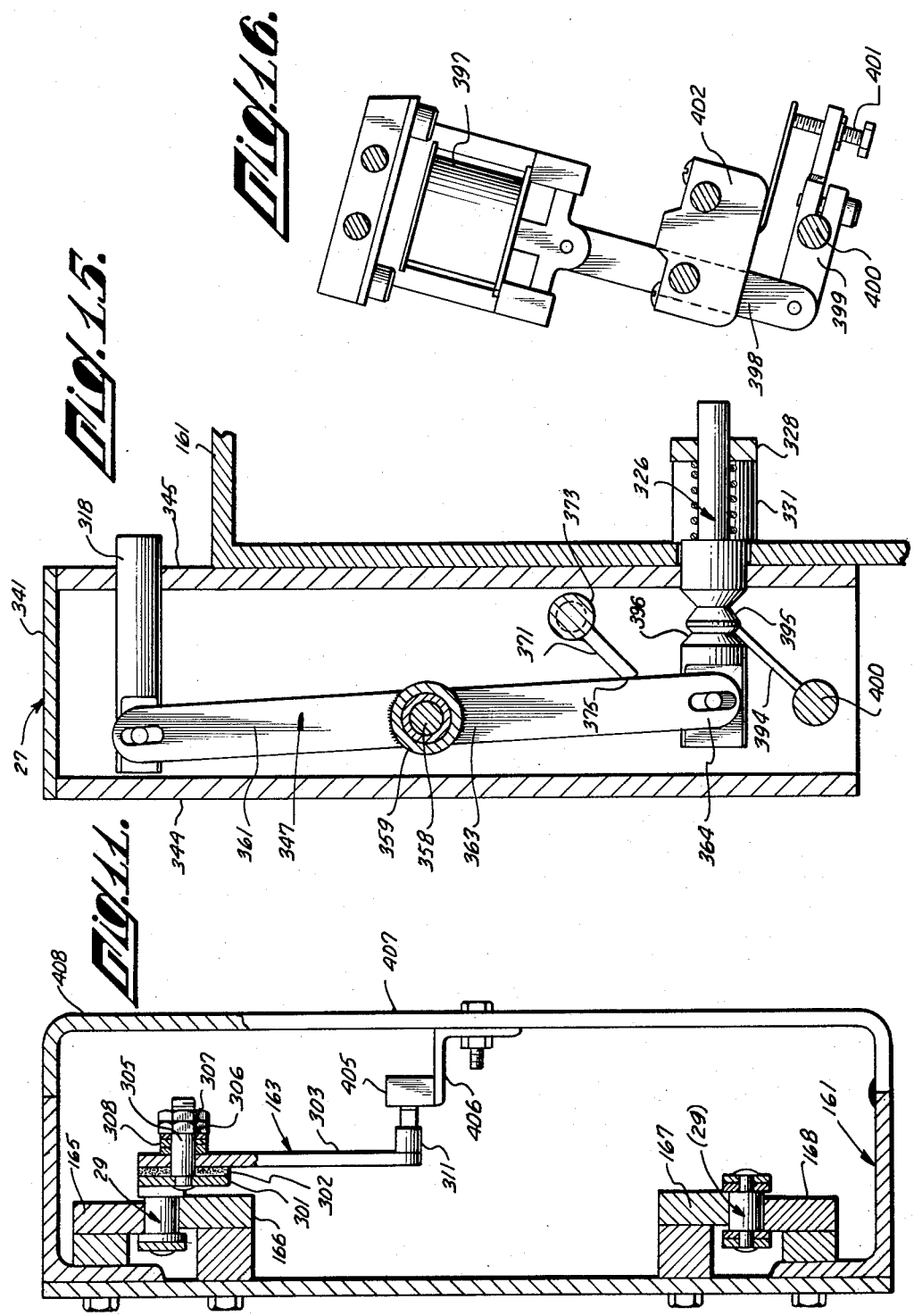

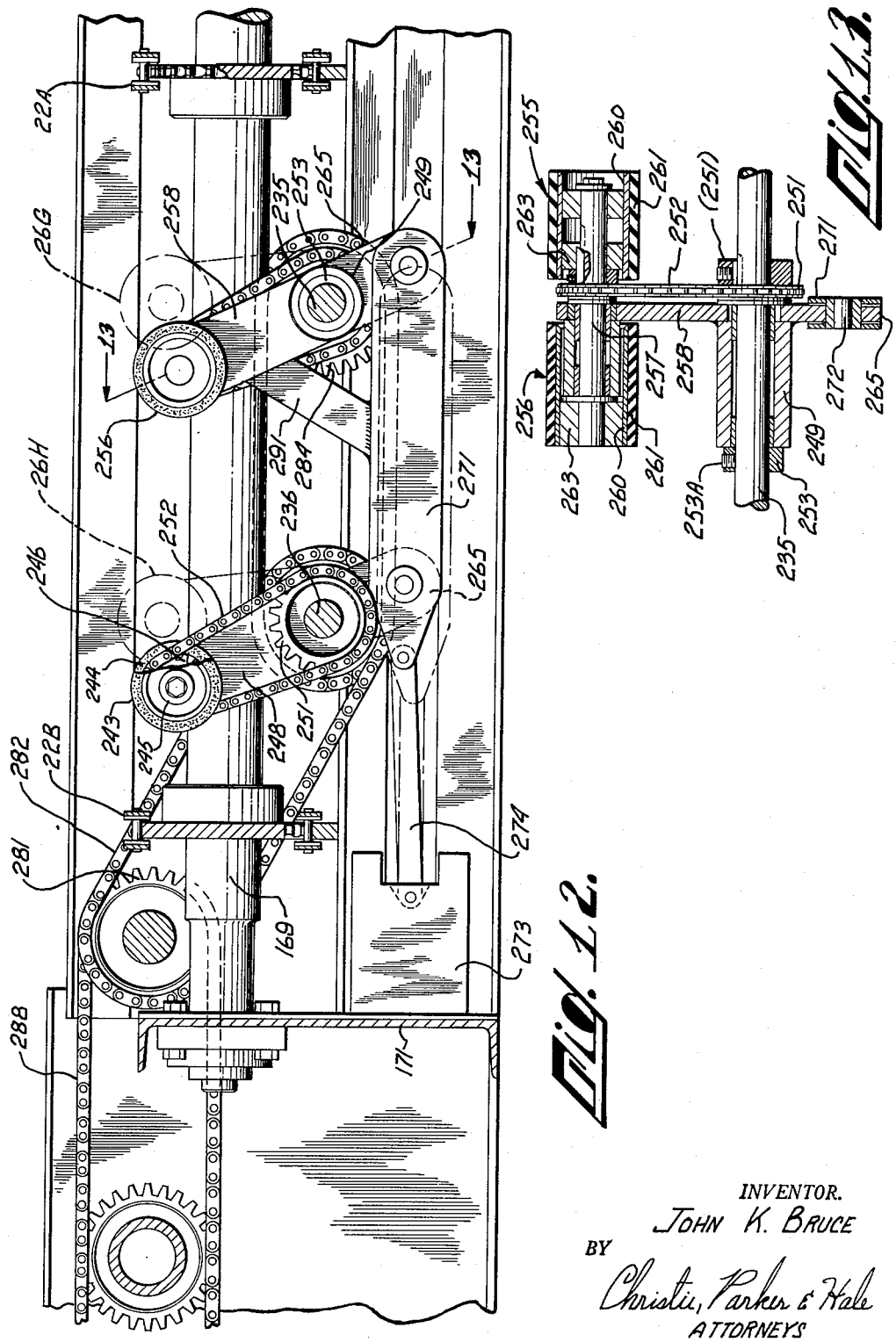

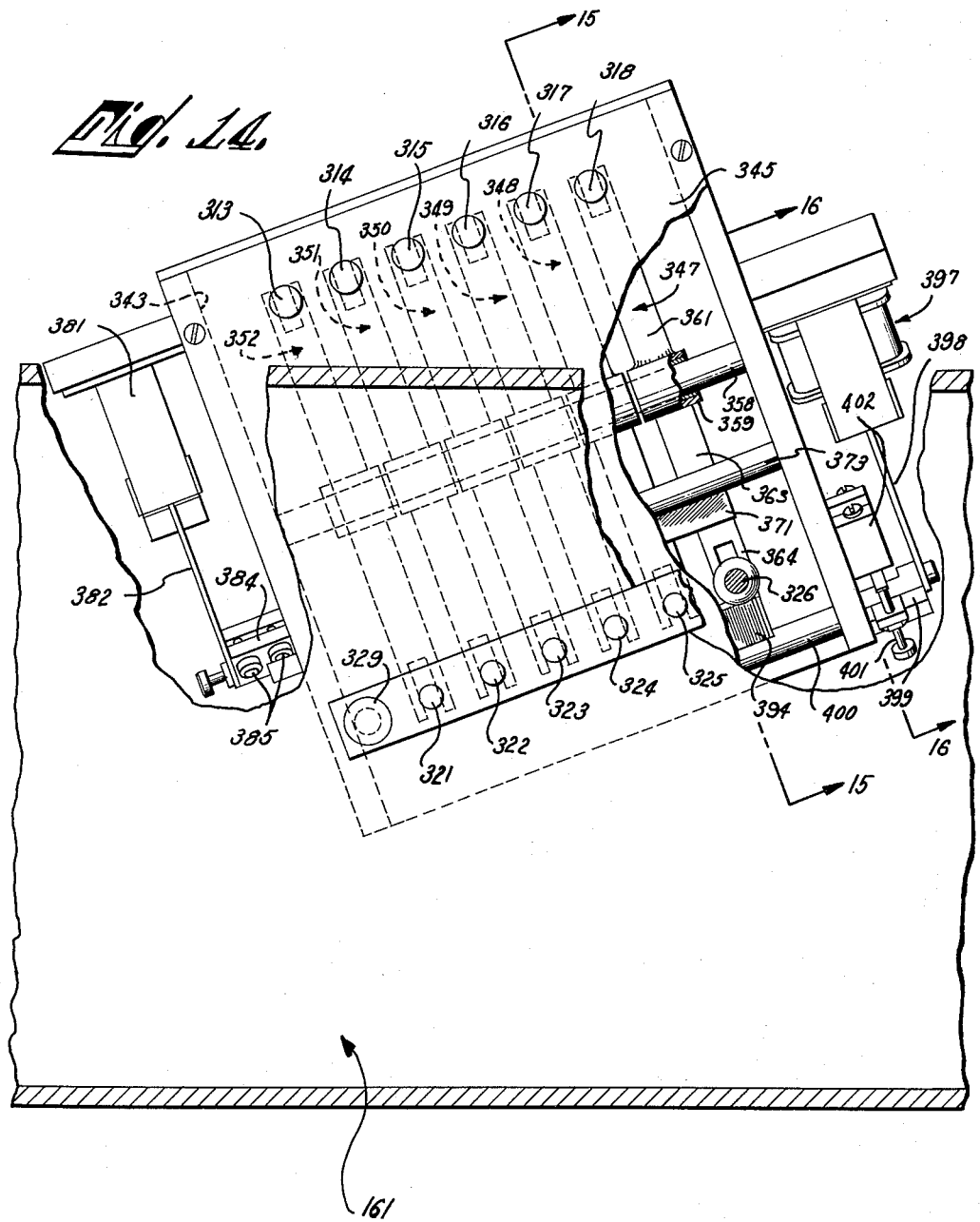

3,044,638
SELECTING AND TRANSFER APPARATUS FOR
CONVEYING ARTICLES
John K. Bruce, 1982 10th St., La Verne, Calif.
Filed Nov. 9, 1959, Ser. No. 851,897
10 Claims. (Cl. 214—11)

The invention relates to process and apparatus for selecting and transferring articles from an input conveyor to any one of a number of output stations. This is a continuation-in-part of application Serial No. 768,395, filed October 20, 1958, now abandoned.

Conveyed articles of many categories often start from a single conveyor and progress to a plurality of stations. The stations may be processing stations or may provide holding locations for differing types of articles which have been sorted from the initial conveyor. The apparatus contemplated by the invention is useful in either case.

Two examples of the use of my instant invention are embodied in my co-pending applications, one of which is Serial No. 731,393, filed April 28, 1958, and entitled Process and Apparatus for Handling Objects, directed to the stacking of boxed articles. A second usage is exemplified by the apparatus in my co-pending application, Serial No. 768,171, filed October 20, 1958, and entitled Apparatus for Short Term Accumulation of Conveyed Articles. Each of these applications is concerned with apparatus which is preferably fed selected articles from a single input conveyor.

It is conventional in many industries for an input conveyor to carry a plurality of articles serially on the conveyor. The articles may differ one from another and be arranged in no particular order upon the input conveyor, or articles of a like nature may be carried by the input conveyor but numbers of the articles may be destined for differing subsequent stations. In either case, it is desirable that there be mechanical means to select and transfer articles on the input conveyor to subsequent stations.

A specific example of a system in which differing articles are arranged serially along a single input conveyor without regard to the sequence of the differing articles is the fruit-packing industry. Conventionally, fruit is washed and sorted by size or ripeness as it comes from the fields. It is usually boxed in accordance with category and placed on an input conveyor at a stage along the input conveyor. The boxed fruit is appraised and removed from the conveyor to differing process stations depending upon its ripeness or size category. The differing process stations may be a plurality of individual conveyors which transport the fruit to different storage areas in accordance with its ripeness. Alternately, secondary conveyors may transport the fruit to juicing machines or to preparatory apparatus for marketing as whole fruit. The fruit may be conveyed to an object stacker such as in the previously mentioned-co-pending application, Serial No. 731,393.

In any of these usages there must be means for selecting the article and means for transferring the article from the input conveyor to the selected output station. My invention contemplates apparatus for accomplishing this purpose which comprises an input conveyor and means for placing articles along the input conveyor and indicator means moving synchronously with the conveyor for indicating the position of respective ones of the articles along the conveyor during the travel of the articles thereon. The invention further contemplates a plurality of output stations and transfer means associated with each output station. Each transfer means is adapted to be actuated by the indicator means to move pre-selected ones of said articles from the input conveyor to selected output stations. Selecting means are also provided operable to orient the indicator means to actuate a particular transfer unit.

In a preferred embodiment of the invention, each of a plurality of indicator means is carried synchronously with the input conveyor so that a particular indicator means may be associated with an article on the conveyor and the orientation between the indicator means and the article remain unchanged. In a second embodiment, synchronism between the position of the article and the indicator means is achieved by placing the indicator means on the input conveyor itself. The choice of either embodiment is based upon the mechanical situation in which the selector is used. While it is possible that the indicator means be carried by a synchronized system having a lesser travel than the conveyor but having the same cyclical rate, fine adjustment is simplified by having the effective travel of the indicator means equal to a travel of the input conveyor and the articles placed thereon.

The preferred indicator means to be moved in synchronism with the position of the article on the input conveyor is a frictionally journalled finger having a contact tab or boss remote from the journal. The synchronous path of the indicator means and its boss is such that they pass adjacent an actuating mechanism. There is an actuating mechanism associated with each output station. The actuating mechanism for a particular station is located with respect to the path of the indicator means so that a particular arcuate orientation of the contact boss with respect to the journal of the indicator finger brings the boss into contact with the actuating means associated with a single station. The actuating means galvanizes the transfer means to move the article associated with the particular indicator.

The transfer means may be the load arm of the apparatus described in the previously mentioned co-pending application, Serial No. 731,393, or may be embodied in a pantograph roller system such as is used in conjunction with my co-pending application entitled Apparatus for Short Term Accumulation of Conveyed Articles and described in detail later in this application.

In the preferred embodiment of the invention, the actuating means is a system comprising a micro-switch adapted to be contacted by the indicator contact boss and a relay connected to a solenoid which effects the movement of the transfer means.

The selector mechanism, which is directly under the control of the operator whose task it is to select which of the successively arriving articles on the input conveyor will be transferred to a particular output station, may vary mechanically with a particular task. Basically, however, the preferred selector comprises a plurality of control buttons each linked to a cam rod which may be pushed into the path of the plurality of indicator fingers. The position of each cam rod varies with respect to the path of the indicator journal. Therefore, it is possible for each of the indicator means to strike a differently positioned cam each time one passes the selector station. The differently positioned cam rods orient the indicator means so that the contact boss thereof contacts a particular one of the actuating means. Thus, by pushing a particular control button, the selector operator may re-orient the indicator means associated with a particular article on the input conveyor so that the pre-positioned actuating means associated with a particular output station causes the transfer means associated with that station to move the article from the input conveyor to that output station.

It is preferred that each actuating means be physically located adjacent the respective output station. However, in certain instances, it may be desirable to disassociate the indicator means and the actuating means from the physical location of the input conveyor and the output stations. In such an installation, the indicator means still moves synchronously with the input conveyor and the travel thereon of the article which a particular indicator means represents, and the actuating means is located with respect to the travel of the indicator means so that it represents the position of the output station along the input conveyor.

Preferably an electrical interlock system is utilized with the selector means so that a selection cannot be made until an article is in position on the input conveyor. The interlock system also precludes motion of an article along the conveyor toward the transfer means until a selection has been made.

The invention provides apparatus whereby articles may be selectively transferred from an input conveyor to any one of a plurality of output stations at the command of an operator. The apparatus of the invention is entirely automatic so that the only manual operation performed is the selecting one. There is no design limitation on the number of output stations which may be utilized. The selector mechanism is a simple one and any operator capable of distinguishing the articles on the conveyor can operate the selector.

These and other advantages of the invention are described in the following detailed description and drawings, in which:

FIG. 3 is a fragmentary sectional elevation taken along line 3—3 of FIG. 1;

FIG. 4 is a transverse sectional elevation taken along line 4—4 of FIG. 1;

FIG. 5 is a detailed elevation, partly in section, of a preferred embodiment of the indicator means of the invention;

FIG. 6 is a fragmentary sectional elevation illustrating the transfer means associated with the output station or stacker to which articles are transferred by the apparatus of FIG. 1;

FIG. 7 is a schematic wiring diagram showing the electrical interlock system associated with the selector of the embodiment of FIG. 1;

FIG. 8 is a fragmentary sectional elevation taken along line 8—8 of FIG. 2;

FIG. 9 is a fragmentary sectional elevation taken along line 9—9 of FIG. 2 and showing the means for placing an article on the conveyor;

FIG. 10 is a fragmentary sectional elevation taken along line 10—10 of FIG. 2 illustrating the means for orienting the indicator means with respect to the input conveyor;

FIG. 11 is a transverse sectional elevation taken through the carrier of the indicator means along line 11—11 of FIG. 10;

FIG. 12 is a fragmentary sectional elevation taken through the transfer means associated with one of the output stations of the embodiment of FIG. 2;

FIG. 13 is a fragmentary sectional elevation taken along line 13—13 of FIG. 12;

FIG. 14 is a fragmentary sectional elevation partly broken away and showing the selector mechanism in detail;

FIG. 15 is a sectional elevation taken along line 15—15 of FIG. 14 through the selector mechanism;

FIG. 16 is an end elevation of the exterior of the selector mechanism; and

FIG. 17 is a schematic wiring diagram showing the electrical interlock system associated with the selector of the embodiment of FIG. 1.

Figure 1:
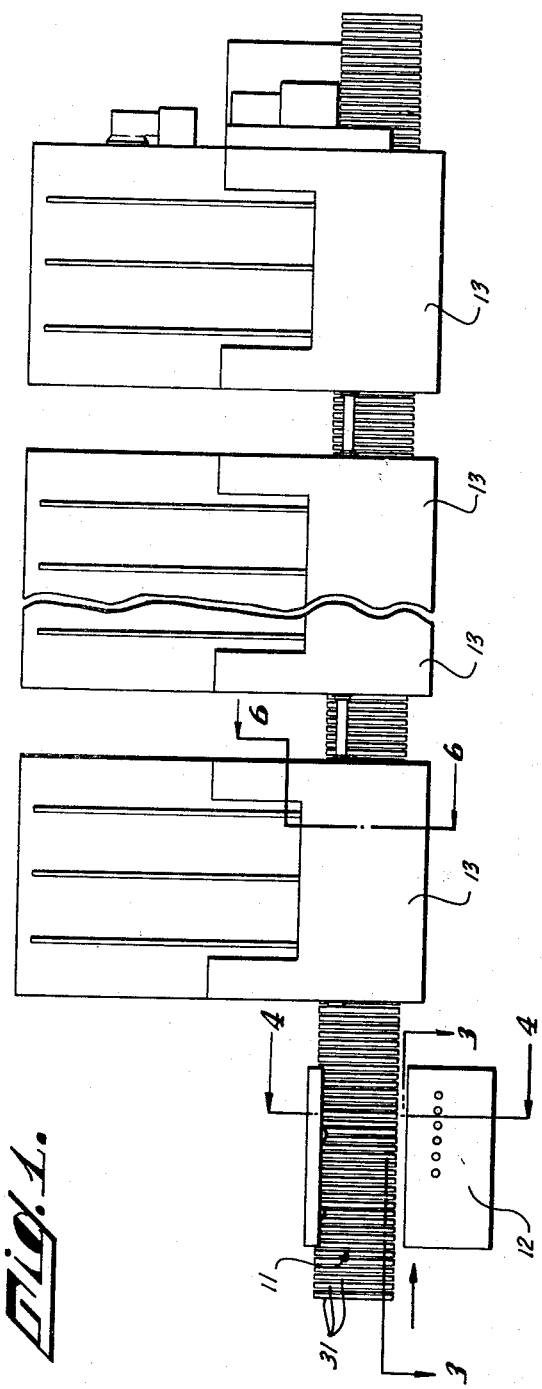
FIG. 1 is a plan view of an embodiment of the invention used with a plurality of output stations embodied in object stackers.

In FIG. 1, an input conveyor 11 passes by a selector unit 12 and proceeds past a plurality of object stackers 13 similar to those described in aforementioned co-pending application, Serial No. 731,393.

Figure 2:
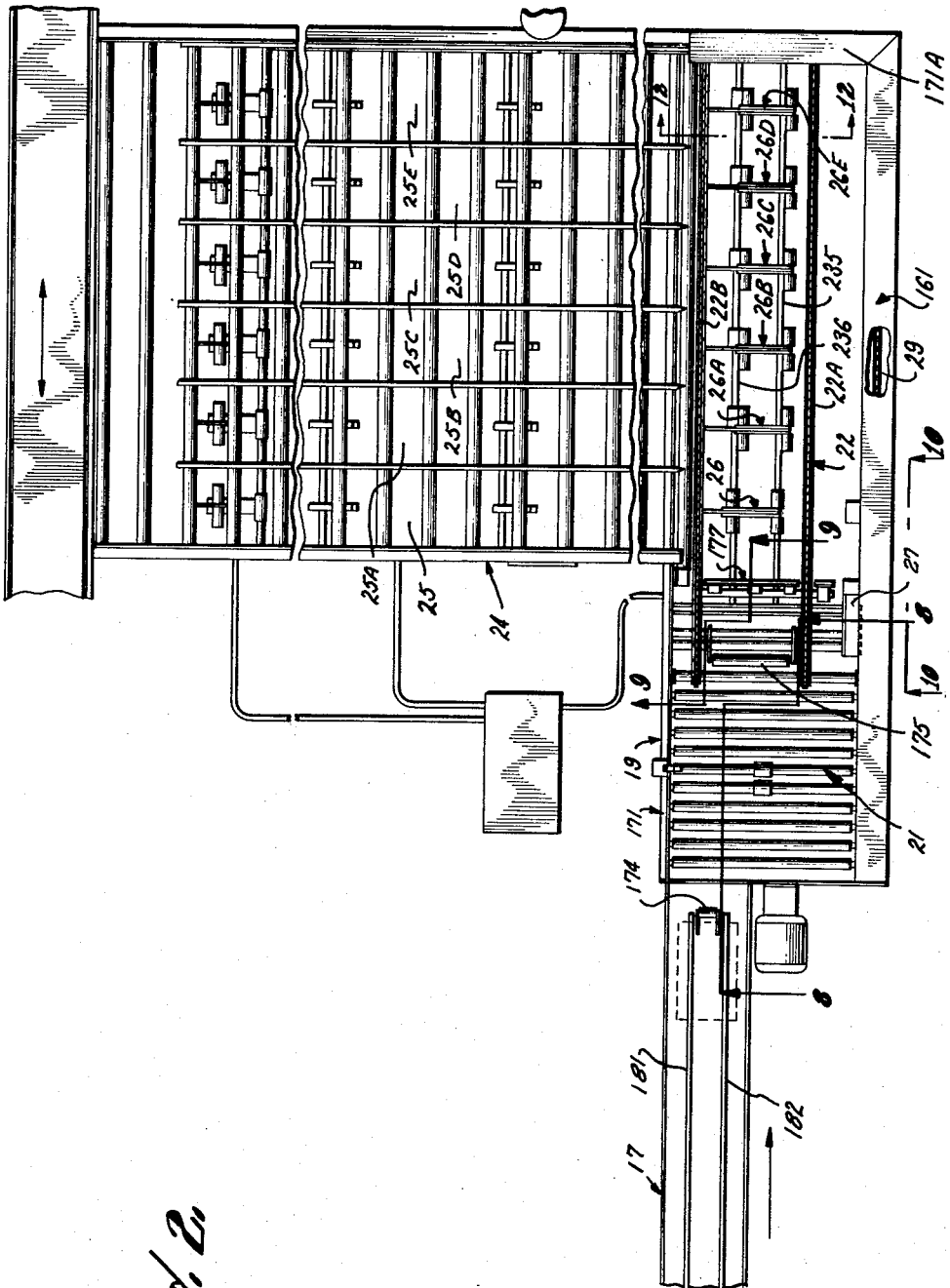
FIG. 2 is a plan view of an embodiment of the invention used in conjunction with output stations embodied in the different conveyors of an accumulator unit.

In FIG. 2, a feed conveyor 17 supplies an input conveyor 19 comprising a roller section 21 and the chain section 22. Articles fed to the input conveyor are transferred to an accumulator 24. The accumulator has a plurality of accumulating conveyors 25, 25A, 25B, 25C, 25D, 25E. Each accumulator conveyor is adjacent a transfer assembly 26, 26A, 26B, 26C, 26E. A selector control 27 similar in function to selector control 12 of FIG. 1 is operable to effect the transfer of selected articles from the input conveyor to the desired output stations embodied by accumulating conveyors 25 through 25E.

The primary difference between the selector mechanisms of FIGS. 1 and 2 is that the plurality of indicator means oriented with respect to articles on the input conveyor of FIG. 1 are attached to the conveyor itself, whereas in the embodiment of FIG. 2, a secondary chain conveyor 29 moves the indicator means of the embodiment of FIG. 2 synchronously with input conveyor 19. The indicator means chain or carrier is preferably co-extensive with conveyor section 22 of input conveyor 19. However, an arrangement in which the secondary indicator means carrier is synchronously in cycle with the input conveyor but not co-extensive with it, is entirely within the scope of the invention.

The embodiment of FIGS. 1 and 3 through 6 has a plurality of indicator means 30 fixed to conveyor 11. Conveyor 11 has a multiplicity of platen strips 31 carried on parallel endless roller chains 33 supported by spaced parallel rails 35, 36. The rails are supported above the ground level by a plurality of legs 37.

FIG. 5 details a typical indicator means and its association with the input conveyor. An indicator finger 41 has a cylindrical hub 42 fixed to one end. The hub and finger are journalled about a threaded shank 43 projecting from a clutch mount 44. The mount has a stub 45 fixed as by welding to one of the platen strips. A friction disk 47 is fixed to a face of the clutch mount remote from the platen. A compression spring 48 about shank 43 thrusts against finger 41 and a thrust collar 49 held by a nut 51 on the threaded shank.

The friction load between hub 42 of the indicator finger and clutch mount 44 is adjusted by tightening nut 51 against the compression spring. A contact boss 52 at the end of the finger remote from its journal may thereby be circumferentially adjusted with respect to the journal.

As shown in FIG. 6, each of the output stations (object stackers in the illustrative embodiment) has associated with it a transfer means 61. The transfer means illustrated in FIG. 6 comprises in part a loading bar 62 which extends generally parallel to the path of the conveyor. The normal position of the bar is outside of the conveyor or remote from the output station represented by the stacker. The loading bar extends between a pair of sweep arms such as the arm 63 journalled at 64 in the stacker. A power arm 65 oscillates continuously in an arcuate path in response to the stacker motive power. A latch 66, pivotally mounted to the sweep arm 63 at 66A, connects it intermittently to the power arm. The latch is actuated by a solenoid 67. When the solenoid 67 is energized to the position shown in FIG. 6, it moves a lever arm 68 which turns an eccentric shaft 69. The rotation of the shaft 69 by energizing the solenoid permits the latch 66 to move in a clockwise direction about its pivot 66A by the urging of a spring 66B. The clockwise rotation of latch 66 enables pin 71, which is fixed to the power arm 65, to engage the end notch in the latch 66 and impart movement to the sweep arm 63 about shaft 64. As a result, loading bar 62 moves over the conveyor and dislodges any articles on the conveyor lying in the path of the loading bar. The transfer means 61 is described in greater detail in my previously mentioned co-pending application Serial No. 731,393.

A microswitch 73 is positioned on rail 35 of the input conveyor. The vertical position of each microswitch of each stacker is different and coordinated with a control button on selector 12. Selector 12 positions each indicator means passing the selector in a manner to be described later so that the means trips a particular microswitch in accordance with the correlation between the attitude of the oriented indicator means and the vertical position of the microswitch.

A properly oriented indicator finger 41 and contact boss 52 strikes microswitch 73 when the indicator means and the article on the conveyor with which it is synchronized reaches the stacker or output station. The microswitch closes and actuates the solenoid 67 so that the latch locks the sweep arm 63 to the power arm 65, and loading bar 62 thereupon transfers the article from the input conveyor to the stacker.

FIGS. 3 and 4 show selector 12 in detail. The selector is housed within a case 75. A plurality of control buttons 77 are mounted above a top plate 78 of the case, each to the top of a vertical control rod 79 movable through the top of the case. Adjacent the upper inner portion of each control rod are latch notches 81, 82. A pivot pin 83 projects through the bottom portion of each rod and pivotally connects the rod to an L-shaped actuating arm 84. A pivot pin 85 at the elbow of the arm pivotally mounts each of the plurality of arms to a respective support block 86. Each support block extends inwardly from a front wall 87 of the case. Lower end 88 of each actuating arm is bifurcated to fit about one of a plurality of cam rods 90. Each cam rod extends through the front wall of the case and through a back wall 92 of the case.

A grooved sleeve 93 is fastened by a set screw 94 near the midpoint of each cam rod. A compression spring 96 is compressed between the grooved sleeve and the front wall of the case. Bifurcated end 88 of each actuating arm may have a pair of pins 98 which extend into a groove 99 of the sleeve. As can be seen from FIG. 4, an actuating arm 84 impels a cam rod 90 outwardly against the load of the spring when any control button is depressed. An outer end 101 of a cam rod is thus thrust into the path of an indicator means 30 passing the selector.

The compression springs tend to return the cam rods to withdrawn position with respect to the path of the indicator means. A latch assembly 103 maintains a selected cam rod in outthrust position until the indicator finger and contact boss have been oriented with respect to the path of the indicator journal. A shaft 105 supports the latch assembly. Shaft 105 extends from end to end of the selector case. A latch blade 106 extends parallel to the shaft and is fixed to a collar 107 journalled on the shaft. Normally, the blade resides in the notch 82 of each of the control rods and prevents further upward movement of the control rods and control buttons under the urging of spring 96. The notches are shaped so that downward motion of the control rod pushes blade 106 from the notches. A latch tongue 108 is attached to collar 107 and forms an acute angle with latch blade 106. The tongue resides in a notch 109 of a spring loaded lock shaft 111. The latch blade, collar and tongue move as a unit about the shaft 105. The lock shaft is slidable through the rear wall of the selector case. A compression spring 112 impels the lock shaft rearwardly. The spring loading is such that the latch blade is normally set to snap into one of the notches of each control rod to secure the control button and the cam rod in either the recessed or outthrust position.

As can be seen from FIG. 3, each of the cam rods 90 and their protruding ends 101 has a different vertical position with respect to the shank 43 about which each indicator finger is journalled. As each indicator finger progresses past the selector, it may strike against any one of the cam rods which has been thrust outwardly by depressing a control button 77. The indicator finger rides against the periphery of the outthrust cam rod end and the contact boss 52 is thereby oriented with respect to the journal of the indicator means. For instance, when the indicator means 30B of FIG. 3 strikes against the upper cam rod, it is oriented so that contact boss 52 has a vertical position close to the path of movement of the journal. However, when the indicator means strikes against the lower cam rod the finger and boss are elevated only slightly toward the path of the journal. The microswitch 73 at each of the output stations with which the selector is associated is vertically oriented differently with respect to the path of the journal of the respective indicator finger. As the input conveyor carries the indicator means past the microswitches, the switch is tripped or not, depending on the orientation given the indicator means when that indicator passes the selector. Each control button and cam rod is correlated with a particular microswitch 73 associated with a given output station or stacker.

The articles carried by the input conveyor are not necessarily arranged serially thereon in any particular order. Therefore, each indicator means must be readjusted with each cycle of the input conveyor. A ramp 121 adjacent an end sprocket 122 of conveyor 11 contacts each returning indicator means as the conveyor carries it about the sprocket. The ramp is adjusted so that it orients each indicator means into a depending position with respect to the conveyor so that the indicator finger may strike any one of the variously positioned cam rods of the selector. In FIG. 3, indicator means 30A is illustrated as returning to restart the conveyor cycle. Continued progress of the conveyor in the direction indicated in FIG. 3 causes the boss 52 to pass over the acute point of ramp 121 and causes the periphery of such boss to come into contact with the upper edge of the ramp 121. Further motion of the conveyor about the sprocket 122 causes rotation of indicator means 30A about its stub 45 because of the arcuate motion of such stub relative to the point of contact of boss 52 with the upper edge of ramp 121. This arcuate relative motion of stub 45 is produced by rotation of such stub about the axis of the sprocket wheel 122. Indicator means 30A is thus rotated about stub 45 to a position substantially perpendicular to the conveyor.

The selector has an interlocking electrical system which permits the selector to effectively operate only when an article is on the input conveyor in proper position to be associated with an indicator means. The interlock system comprises in part a pair of lock rollers 125, 126 suspended by a cantilever arm 127 coupled to a solenoid 128. The cantilever arm slides in ways 129 fastened to the front wall of the case. In FIG. 4, the rollers are in extended position and lock an article such as a produce box 131 so that the input conveyor cannot impel it along the conveyor path. The container is guided against the lock rollers by a guide strip 133 which extends from the selector case, and guide rollers 135 on the opposite side of the conveyor. A frame 137 extending upwardly from the conveyor support holds the guide rollers.

A microswitch 139 has a sensing arm 141 which articles carried by the conveyor contact as they rest against the lock rollers. Microswitch 139 is part of the interlock system which provides that no effective selection is made unless a conveyed article rests against the lock rollers. A first and a second sensing microswitch 143, 144 form additional parts of the interlock system. Microswitch 143 is located with respect to the path of the conveyor so that it is tripped when an indicator finger enters the zone adjacent the selector. Contact with the microswitch 143 indicates that an indicating means is available to travel with the conveyed article against the lock rollers. Microswitch 144 defeats any attempt to make a selection when it is tripped by an indicator means leaving the zone before a selection is made.

A latch solenoid 146 operates on an armature 147 fastened to external end 148 of lock shaft 111. When the solenoid is actuated, lock shaft 111 moves latch tongue 108 away from the vertical rod of the control button to preclude the control rod from latching in outthrust position. Microswitches 139 and 143 are serially connected to defeat solenoid 146. Thus no selection can be made unless microswitch 139 senses an article in position on the conveyor and microswitches 143 and 144 sense the adjacent presence of an indicator means at the switch 143, and their coincident sensing defeats solenoid 146.

A lock defeat microswitch 151 is contacted by the bottom of each control rod when a control button is depressed. It operates a relay 152 which supplies power to lock roller solenoid 128. Thus, when a selection is made, lock rollers 125, 126 are pulled by the solenoid from the path of the article and the article is conveyed along with the indicating means associated therewith. The article and indicating means travel to a position opposite the output station whose microswitch 73 is coordinated with the orientation imposed upon the instant indicator means by the operator of the selector mechanism. When the contact boss trips the microswitch, solenoid 67 is energized, and load bar 62 transfers the article into the stacker.

When a box is in position, the switch 139 is changed from its normally open position, as shown in FIG. 7, to a closed position. If a selection has been made, the switch 151 is changed from its normally open position, as shown in FIG. 7, to a closed position. This provides a series path through the relay 152. The relay 152 is actuated by the momentary closing of the switch 143 as a sensor element moves into the region of the selector cam rods. This completes a series circuit through the solenoid 128, energizing the solenoid and releasing the article. In this way, the releasing of the article is synchronized with the movement of the indicating means so that the article and indicating means move on to the stacker region in a predetermined spacial relationship, as determined by the relative position of the lock rollers 125 and 136 and the switch 143.

When the indicating means passes the switch 144, the solenoid 146 is energized, releasing the selected cam rod. The switch 139 and the switch 143, as described above, act in series to defeat the energization of the solenoid 146 when an article is in position. If the article is not in position, switch 143 actuates solenoid 146. It will be evident that the switch 144 acts, as stated above, to defeat an attempted selection made by pressing one of the cam rods after a selector arm has passed the switch 143 so that no effective selection is made. If a box moves into position against the switch 151 after an indicator means has passed the switch 143, the switch 144 likewise defeats an attempted selection.

In FIG. 7, the circuitry of the interlock system is schematically illustrated. As can be seen from this diagram and the physical setup of FIGS. 3 and 4, a cam rod cannot stay outthrust unless an article and an indicating means are properly associated with respect to the conveyor.

The invention embodied in the above described apparatus is adapted to more than the particular use illustrated. The position of the indicator means can be altered to accommodate other physical requirements imposed by such considerations as the particular transfer means used to move the articles from the input conveyor to the output station. The preferred embodiment of the invention disassociates the indicator means from the conveyor itself. As illustrated in FIGS. 8 through 16, the plurality of indicator means of that embodiment are carried by a chain conveyor which, while synchronized with the input conveyor, may be separate from it.

As illustrated schematically in FIG. 2, the previously described feed conveyor delivers articles to the input conveyor 19. The input conveyor is supported in part by a box housing 161. The housing protects carrier chain 29 to which a plurality of indicators, like indicators 163, 163A, are secured (see FIG. 10). The carrier chain runs between guide strips 165, 166 along its upper or work travel and between guide strips 167, 168 on its return travel. The carrier chain for the indicators is driven directly with chain conveyor section 22 of the input conveyor. The input conveyor is powered by conventional means (not shown) which turns sprockets meshed directly with spaced parallel chains 22A, 22B of the chain conveyor. The sprocket driving chains 22A, 22B and 29 are commonly driven by a power shaft 169 (see FIG. 12) about which each of the sprockets is fastened at the downstream end of conveyor travel.

The individual rollers of conveyor portion 21 of the input conveyor are supported at one end by box housing 161 and at their opposite ends by a conveyor framework 171. Framework 171 supports the input end of previously mentioned accumulator 24. Each of the conveyors in the accumulator represents an output station to which articles are transferred from input conveyor 19.

As in the previously described embodiment, the input conveyor has means for placing articles on the conveyor to insure proper correlation between the article on the conveyor and the indicating means to accompany that article. In the preferred embodiment, the means for placing the articles on the conveyor is comprised in part of two spaced check rollers 174 and 175 and a lock bar 177. Referring now to FIGS. 2 and 8, check rollers 174 and 175 protrude into the path of objects on the conveyor. Check roller 174 extends transversely above the top level of conveyor chains 181, 182 of feed conveyor 17. Check roller 175 intrudes between and above adjacent transverse rollers 183 of roller conveyor 21.

Each of the check rollers extends between pairs of L-shaped arms 184, 184A, respectively, fixed to transverse mounting shafts 186, 186A. The shaft of each roller is journalled at its ends at the framework of the respective conveyor. Fixed to each transverse mounting shaft and depending therefrom are compound stop arms 188, 188A, respectively. Each stop arm is held by an extension spring 189 or 189A, having an end fixed to the framework of the conveyor. Each compound stop arm 188, 188A has a stop tang 191, 191A, respectively, held by the extension spring against an adjustable stop 193, 193A, respectively. As shown by the dotted lines 188B of FIG. 8, compound stop arm 188 swings against second stop 193B when a solenoid 195 is energized. Each of the compound stop arms 188, 188A supports a roller seat 197, 197A, respectively, extended horizontally from the upstream side of each stop arm. The seats register against rollers 199, 199A mounted to an L-shaped lever arm 201 in the case of stop arm 188, and to an L-shaped lever arm 202 in the case of stop arm 188A. Lever arm 201 is linked at its end remote from the roller to an armature 195A of solenoid 195 by an armature extension 195B.

L-shaped arm 202 is pivoted at its elbow by a pivot pin 203. A rivet 204 fastens a link strip 205 to the end of lever arm 202 remote from the roller. An extension spring 206 is fastened at one end to a pin in the stop arm and at its other to the pivot pin 204 so that roller 199A tends to bear downwardly against roller seat 197A of compound stop arm 188A.

The link strip extends from L-shaped lever arm 202 to a pivot pin 207 at the juncture of the upper arm 208, of L-shaped lever arm 201 with extension 195B. Pin 207 joins the link arm to lever arm 201 and holds one end of an extension spring 205A fastened at its other end about a pin 209 on compound stop arm 188 of check roller 175. FIG. 8 illustrates that activation of solenoid 195 pulls lever arm 201 into the dotted position 201A. Link strap 205 is thereby displaced and imparts a like motion to lever arm 202. The displaced lever arms withdraw rollers 199, 199A from their respective roller seats so that only springs 189, 189A hold the respective check rollers in an impeding position in the paths of articles on the two conveyors 17, 21. Each of the conveyors is positively driven. Articles on them are impelled with sufficient force to overcome the spring load and depress the check rollers so that the articles on the conveyor may pass over the rollers. As soon as the article passes over them, the rollers spring upwardly and if solenoid 195 is deenergized, each lever arm roller once again seats against the respective compound stop arm and latches the check rollers into stop position.

Final correlation between conveyed articles and the indicator means is achieved by lock bar 177. As shown in FIG. 9, lock bar 177 comprises a transverse blade 211 fixed by a plurality of fingers 211A to a transverse rod 212 extending between framework 171 and box housing 161. Rod 212 is journalled to the framework and the housing for limited rotational motion. A latch plate 214 is fixed to the rod near each of its journalled ends. The latch plates extend at a slight angle to the horizontal. Each tapers upstream of the conveyor to an edge line 216 normally lodging against a contact roller 217 of an interlock microswitch 218.

Microswitch 218 is a portion of an interlock system controlling the functioning of the selector in much the same manner as described in conjunction with the embodiment of FIGS. 1 and 3 through 7. A helical torque spring 221 is fastened to a pin 222 in the latch plate at one of its ends and to a pin 223 in the framework at its other end. Lock bar 177 and its latch plate are impelled against an adjustable stop 225 by the torque of spring 221.

In FIG. 9, lock bar 177 is illustrated in its normal position. In operation, an article carried by chain conveyor 22 impinges against blade 211 and brings latch plate 214 into contact with a stop roller 227 suspended by an arm 229 from an armature 230 of a latch solenoid 231. Solenoid 231 of the preferred embodiment performs the same function as the lock roller solenoid of the embodiment of FIG. 4. The control solenoids of check rollers 174, 175 and bar 177 are electrically connected so that articles on the feed conveyor and input conveyor advance at the same time. A box held by check roller 174 is released into the roller conveyor section of the input conveyor at the same time that a box or other article is released by check roller 175 to lodge against lock bar 177 after the lock bar has depressed to permit an article to advance on input conveyor section 22.

In operation, an article on chain conveyor section 22 and locked in place by lock bar 177 must be correlated with an indicator means moving in synchronism with conveyor section 22. In the preferred embodiment illustrated in FIGS. 2 and 8 through 16, the indicators are carried by separate carrier chain conveyor 29. The selector mechanism 27 which is supported by housing 161 performs the same function as selector 12 of the first described embodiment. Selector mechanism 27 orients the indicators carried by carrier chain conveyor 29 so that the indicators actuate transfer means associated with a particular output station.

In the illustrative embodiment, the output stations are represented by the accumulator conveyors 25 through 25E of the short-term accumulator 24. Each accumulator conveyor has a transfer assembly 26 through 26E, respectively. The transfer assemblies are detailed in FIGS. 12 and 13 and each is identical, so description of one will suffice for all. The transfer assemblies differ from the transfer means illustrated with the first described embodiment. However, their function is the same. They effect the transfer of articles on the input conveyor from that conveyor to the output stations. Transfer is accomplished in accordance with the orientation made of an indicator moving in synchronism with the input conveyor and correlated with an article on the conveyor.

All of the transfer assemblies are supported on a pair of driven shafts 235, 236. Each shaft is journalled at its downstream end in the input conveyor framework 171a, and its upstream end (see FIG. 9) in a conventional journal 238 supported on a plate 239 held by a pair of inverted angles 240, 241 extending between framework 171 and carrier chain housing 161. A hexagonal brace 242 parallels the inverted angles to stabilize and support the guide plates 242A for chains 22A and 22B.

Each transfer assembly has two pairs of friction rollers supported above the driven shafts. A first pair of friction rollers 243, 244 are rotatably mounted on a roller axle 245 adjacent the accumulator. A driven sprocket 246 is keyed to the axle adjacent a support arm 248 which is in turn supported by a journalled hub 249 about shaft 236. A drive sprocket 251 is keyed on shaft 236 and linked to sprocket 246 by a roller chain 252. Support hub 249 is located on the driven shaft between a locating collar 253 held by a set screw 253A to the shaft and drive sprocket 251.

Each transfer assembly has a second pair of friction rollers 255, 256 supported rotatably on a roller axle 257 by a support arm 258. The arm 258 is held on driven shaft 235 in identical fashion to the arrangement between support arm 248 and driven shaft 236. The same reference characters have been used to designate like parts. Roller axle 257 is likewise driven by a chain and sprocket system identical to that driving axle 245 of the first pair of friction rollers.

All of the friction rollers of each transfer assembly have an inner metallic sleeve 260 and an outer friction cover 261. Each metallic sleeve is press fitted about a drive ring 263 keyed or otherwise fixed to the respective roller axle. Therefore, when drive sprocket 251 on the driven shaft puts drive chain 252 into motion and drives driven sprocket 246, the respective roller axle rotates the friction rollers.

In the position shown in FIG. 12, the friction rollers are below the bottom surface of any article carried on the chains 22A, 22B, and although the rollers are rotating, they are out of contact with the article. Each support arm has a lower portion 265 extending below the driven shaft to which it is attached. The lower ends of the support arms are connected by a generally horizontal pantograph arm 271 by a connector 272. An end of the pantograph arm is connected to an actuating solenoid 273 by a link bar 274. The linkage and solenoid are typical for each transfer assembly. As shown by phantom lines 26G and 26H of FIG. 12, when the solenoid is actuated, the link bar and the pantograph arm revolve the support arms of both pairs of friction rollers about their respective driven shafts and raise them into contact with the article on the chain conveyor section of the input conveyor. The friction rollers are continuously driven by shafts 235, 236, and the article on the input conveyor is both lifted and impelled by the rotation of the friction rollers from the conveyor chains into the receiving section of the selected accumulator conveyor.

In the embodiment of FIG. 12, the driven shafts of the transfer assemblies derive their motion from a chain sprocket 281 and a roller chain 282 which turn a sprocket (not shown) fixed to driven shaft 236. The motion of driven shaft 236 is communicated to driven shaft 235 by a chain linking a second sprocket on driven shaft 236 and sprocket 284 on shaft 235. The sprockets are sized so that the rotary speeds of the two driven shafts are equal.

Drive sprocket 281 is turned by a drive chain 288 which drives the conveyor rollers of the various accumulator sections. This is a convenient although not necessarily exclusive means of powering the driven shafts of the transfer assemblies.

The linkage between support arms of the friction rollers in each transfer assembly assures that the pairs of friction rollers on each support arm move together and in the same degree. The repose angle of the support arms is determined by a stop 291 against which the support arm of one of the roller pairs of a given assembly lodges. The stop is supported by the pantograph arm linking the lower portions of the support arms. When solenoid 273 is de-energized, the weight of the friction rollers and the support arms is sufficient to return the support arm against the stop. In stopped position, the rollers are out of contact with the bottom surface of any article conveyed on the chain conveyor past an unactuated transfer assembly.

The friction rollers of each transfer assembly have been described as driven rollers. This is the preferred embodiment. However, it is possible to utilize first and second pairs of friction rollers with each transfer assembly in which only the rollers adjacent the output station are driven. The second pair of friction rollers remote from the output station can be idlers. However, driving both friction roller pairs transfers articles more rapidly from the friction conveyor to the output station. Rapid transfer is advantageous in that the correlation between the article in the conveyor and its associated indicator means need not be as exact as the transfer is less rapid. Also, a continuously operating input conveyor can be effectively used with a rapid transfer means.

As in the previously described embodiment, the embodiment of FIGS. 2 and 8 through 16 has a selector. Selector 27 of the second embodiment also orients an indicator means so that the means causes a particular transfer assembly to move a selected article from the input conveyor to a selected output station. The second and preferred embodiment utilizes carrier chain 29 to move a plurality of indicators like indicators 163, 163A in synchronization with the input conveyor. Carrier chain 29 is coextensive with input conveyor section 22 and as previously described, is driven commonly with the conveyor section 22 by means of shaft 169.

Referring now to FIGS. 10 and 11, carrier chain 29 has indicators 163 attached to it preferably at regularly spaced intervals. An attachment plate 301 is fixed to one of the outside links of the roller chain constituting carrier 29. A friction facing 302 is fixed on the outside face of plate 301. An indicator finger 303 is journalled about a cylindrical stub 305 which is riveted within plate 301. Cylindrical stub or journal 305 is threaded at its end remote from the plate. A binding nut 306 and a lock nut 307 compress a plurality of lock washers 308 against the outer face of finger 303. The tension and therefore the friction between friction face 302 and the indicator finger may be adjusted by means of the nuts 306, 307.

A contact boss 311 on an end of the finger remote from the cylindrical stub is similar in appearance and function to boss 52 of the previously described indicator means.

Carrier chain 29 cycles at the same rate as does input conveyor section 22. Thus the travel of an indicator on the carrier chain is equal to the travel of an article on the input conveyor.

The selector 27 has six control buttons 313 through 318. The control buttons are linked to cam rods 321 through 326, respectively. The selector is a unit which is fastened to box housing 161 at an angle to the horizontal. The linkage between the control buttons and the cam rods may thus be identical since the difference in elevation between lower cam rod 321 and upper cam rod 326 is achieved by canting the selector instead of by changing the length of the linkage between the control buttons and the cam rods. Therefore, selector 27 represents the preferred embodiment of the sub-combination of the invention.

The cam rods project through an inner wall 161A of the housing. Their ends within the housing pass through a support strip 328 mounted to wall 161A by end spacers 329, 331.

The linkage between the control buttons and the cam rods of selector 27 is illustrated in FIGS. 14 and 15.

The described embodiment shows six output stations. Therefore, six cam rods are provided in the selector 27. The number of cam rods of course may vary with the number of output stations. The limitation on the upper limit of output stations is determined by the particular usage to which the selecting and transfer apparatus is directed. The case housing the mechanism of selector 27 comprises a top plate 341, end plates 342, 343, a back plate 344 and a front plate 345. The housing is joined in conventional fashion. The front plate is broken away in FIG. 14 to disclose a linkage assembly 347 between control button 313 and cam rod 326. The linkage is identical between each control button and cam rod pair. A journal shaft 358 extends between the end plates and is fixed by conventional means to the end plates. Linkage assemblies 347 through 352 are supported on the journal shaft each by a bushed sleeve 359 journalled on the shaft. An upper member 361 extends from each sleeve to the inward end 362 of a control button. It is pivotally fixed to the end of the button. A lower member 363 is fixed to each sleeve and extends downwardly toward the cam rod in alignment with the upper member. Each lower member has a clevice end 364 by which it is fastened pivotally to a cam rod. The construction is typical for each of the mechanical linkages 347 through 352 extending between the control button and cam rod pairs. For instance, the linkage assemblies 347, 348, 349, 350, 351 and 352 each have a journal sleeve, upper and lower members and lower clevice ends linking between their respective control buttons and cam rods. It is apparent from FIG. 15 that inward pressure on the control button causes the aligned upper and lower members to revolve about journal shaft 358. The swing of lower member 363 causes cam rod 326, for instance, to protrude into the path of the indicators carried past the zone of the cam rod ends.

A locking panel 371 extends across all of the lower members of the selector linkage. The panel is affixed to a rotatable shaft 373 extending between end plates 342 and 343 of the selector case. The swinging edge 375 of the panel contacts all of the lower members of the mechanical linkage. When locked in place, the panel precludes motion of the lower members, preventing the outthrust of any cam rod.

The position of locking panel 371 is controlled by a lock solenoid 381 mounted to end panel 343 of the selector case. A strap 382 connects the armature of the lock solenoid to a lever arm 384 clamped by screws 385 to an exteriorly extending end of shaft 373. The lock solenoid, when actuated, keeps panel 371 against the link asemblies of the selector so that the selector is incapable of making a selection. The lock solenoid is actuated when an indicator such as the indicator 163 of FIG. 10 trips a microswitch 391 at the start of the selecting zone. Microswitch 391 is connected to control a relay 392 which controls the power flow to lock solenoid 381. Microswitch 391 acts to turn on the relay 392 when an indicator strikes it. The locking panel thereupon opposes the motion of the selector linkage and a cam rod may not then be outthrust into the path of the indicator.

After its passage through the selection zone indicator 163 strikes a further microswitch 393. Microswitch 393 is connected to the relay 392 controlling lock solenoid 381 and de-energizes it when tripped. The de-activated lock solenoid lets the locking panel swing out of a position barring operation of the selector.

A second latching panel 394 extends across the interior of the selector case below the cam rods 321 through 326. Each of the cam rods has a pair of annular notaches 395, 396. Notch 395 is deeper. FIG. 15 illustrates the latch panel residing in notch 396 of cam rod 326. The cam rod is shown outthrust to orient an indicator.

Normally, the latch panel resides in notch 395 when the cam rod is in its withdrawn position. The position of latching panel 394 is controlled by a latch solenoid 397 mounted to end panel 342 of the selector case. An armature strip 398 links the solenoid armature to a lever arm 399 clamped to a shaft 400 journalled in the opposite end panels of the selector case. The shaft is fixed to the latching panel. When microswitch 393 is closed by an indicator passing it, latch solenoid 397 is activated. The latching panel is normally turned upwardly into notch 395 or 396 by the action of gravity pulling the solenoid armature downwardly. Thus, when a control button is pressed, the cam rod moves outwardly and displaces the latching panel. However, because the solenoid is gravity loaded, the latching panel springs upwardly into notch 396, holding the cam rod in the outthrust position. Therefore, the cam rod remains in position to cam the passing indicator into proper orientation.

The movement of the latch plate from deeper notch 395 to shallower notch 396 displaces lever arm 399 sufficiently to cause a contact screw 401 to effect the closure of a microswitch 402. Microswitch 402 therefore is tripped each time an effective selection is made. It is linked through a relay-operated switch to solenoid 231 which permits lock bar 177 to be depressed downwardly by an article on the conveyor and thereafter be overridden by the article. The article may then advance on the input conveyor in synchronism with the indicator that has tripped microswitch 391.

The selector case is proportioned so that the operator may sit facing the incoming articles and grasp the selector with the fingers of the right hand and manipulate the control buttons with the right thumb. This mode of operation is efficient and the position may be maintained without appreciable fatigue for the long periods through which the equipment is operated.

The operation of the selector may best be understood by considering the operation of the circuit as shown in FIG. 17 with boxes moving through the conveyor system. Assuming first that no boxes have passed the first stop 174, the switch 218 is in its closed position as shown in FIG. 17. When an arm 163 passes the switch 391, a relay 392A is energized, completing a power circuit through the solenoids 195 and 231. This permits the box to pass the first barrier 174 and come up against the second barrier 175. The next arm to actuate the switch 391 repeats this process, allowing the box to proceed to the third stop 177. This actuates the switch 218 so that the actuation of the switch 391 and energizing of the relay 392A cannot complete a circuit through the release solenoids 195 and 231 until a selection has been made.

This condition remains until a selection is made by depressing one of the selector buttons 313—318. Once a selection is made, the switch 402 is actuated. Now both switches 218 and 402 are in the opposite condition from that shown in FIG. 17. As a result, the next arm to actuate switch 391 and energizes relay 392A completes a circuit through the release solenoids 195 and 231. In this way, the article is released by the stop 177 and is moved along by the conveyor in synchronism with one of the indicators 163.

As mentioned above, unless a selection has been made, the lock solenoid 381 is energized to prevent a selection being made while the arm is passing between the switch 391 and the switch 393, i.e., passing through the region of the cam rods 321—326. This is to prevent a selection from being made too late for the selected cam rod to position the indicator arm 163. As can be seen in FIG. 17, when the relay 392A is energized, the circuit is completed through the relay 392 and the selector switch 402. The relay 392 completes a circuit through the solenoid 381. Contacts actuated by the relay 392 complete a "hold" circuit through the switch 393 in its normal position so that the relay 392 remains energized even after the relay 392A drops out. Thus the relay 392 and the lock solenoid 381 remain energized until the switch 393 is tripped.

If a selection has been made and the selector 402 has been actuated, the switch 393, when actuated by a passing indicator arm, completes a circuit for energizing the latch solenoid 397. This disengages the latch panel 394 from the notch 396 of the selected cam rod 326, permitting the cam rod to retract so that a new selection can be made.

Referring again to FIG. 10, the direction of the indicator carrier chain travel is shown by arrow 403. As illustrated, carrier chain 29 suspends indicator 163 in the zone into which the cam rods of the selector protrude. Cam rod 321 may be outthrust by pressing control button 313. Indicator finger 303 of indicator 163 has passed over outthrust cam rod 321 and, as a consequence, has been cammed into the orientation shown. Had any of the other control buttons been pressed, the elevation of contact boss 311 with respect to cylindrical stub or journal 308 would be different.

The elevation of the contact boss is such that it trips a microswitch 405 positioned on an angle iron 406 cantilevered from a framing bracket 407 of the box housing. Normally, a pair of cover plates 408 abut against each side edge of bracket 407. In FIG. 10, the cover plates have been removed to simplify illustration.

Microswitch 405 is the sensing mechanism for first transfer assembly 26. Its function is similar to the microswitch 73 described in conjunction with the apparatus of FIG. 1. Inspection of FIG. 10 shows that contact boss 311 will strike the contact lever of microswitch 405 as carrier chain 29 moves contact arm 163 in the direction of arrow 403. It is preferred that the microswitches, like microswitch 405, at each of the transfer assemblies be electrically linked to a relay (not shown) which in turn is connected to the transfer assembly actuating solenoid similar to solenoid 273 described in conjunction with FIGS. 12 and 13. In this preferred electrical linkage, the microswitches can have a small power capacity and therefore be miniaturized.

The sensing microswitch associated with each of the transfer assemblies has a distinctive elevation with respect to the path of the cylindrical stub or journal 308 about which each indicator finger is oriented. Therefore, as in the previous embodiment, the orientation imposed upon the indicators by the cam rods of the selector position the contact boss of the indicator so that it strikes only one of the six microswitches and thereby actuates only one transfer means.

As indicated heretofore, the articles on the input conveyor may not arrive in any particular order at the selector station. Therefore, each indicator means must be re-oriented as it repeats its work cycle.

After passing through the region of the selector switches, the carrier chain moves over a drive sprocket (not shown) on the drive shaft 169. The diameter of this shaft (as seen in FIG. 12) is not much smaller than the inner radius of the chain passing around the sprocket. In passing over the shaft 169, the arm 303 of the indicator 163 is forced into the position indicated at 163A. However, this is incidental to the operation, for it is not essential that indicator 163A have any particular preset position. Camming ramps 411 and 412 located adjacent idler sprocket 413 at the upstream end of the carrier chain reposition returning indicators such as indicator 163A into the position shown by the dotted lines 163B of FIG. 10. The camming ramp 411 is merely a safety device to prevent the arm 163 from ever dropping below the end of the ramp 412 and jamming the machine. As the chain link goes around the sprocket 413, the associated indicator 163 tends to rotate in a clockwise direction because of its frictional tie to the link. This brings the end 311 of the indicator against the upper edge 415 of the ramp 412. As a result, the indicator 163 is forced to rotate in a counterclockwise direction relative to its supporting chain link into the relative angular position between the arm and link shown by the indicator 163B. When oriented into the position indicated at 163B, the indicator finger spans the entire zone into which the cam rods may be outthrust. This is the preferred operation of the apparatus of the invention so that each indicator is capable of assuming any of the positions in order that it may activate any of the transfer means associated with any particular output station.

The illustrative embodiments of the invention demonstrate that the invention is broad enough to be adapted to many uses. The apparatus embodying the invention may be comprised of many conventional readily available components. The electrical linkage which makes the operation of the apparatus foolproof is relatively simple and makes it possible to employ semi-skilled help at a consequent saving. The invention has been described in conjunction with two output stations situation. Those familiar with the conveyor art can readily envision many more situations in which the spirit of the invention can be utilized to effectively transfer articles from one carrying system to further processing stations.

What is claimed is:

1. Apparatus for conveying articles comprising a continuously moving input conveyor, indicator means movable in synchronism with the input conveyor, stop means for interrupting the movement of an article being carried on the conveyor at a predetermined position along the input conveyor, means responsive to movement of the indicator means past a predetermined position for releasing said stop means so that the article is released to again move on the conveyor but in correlation with an indicator means, a plurality of output stations each adapted to receive selected articles from the input conveyor, transfer means operable to move articles from the input conveyor to an output station, sensing means associated with each output station and responsive to the indicator means for actuating the transfer means, and selector means for setting an indicator means correlated with a particular article on the input conveyor so that the indicator means causes a response in only the sensing means associated with a particular output station.

2. Apparatus in accordance with claim 1 in which each transfer means comprises an impeller movable against an article to impel the article from the input conveyor to the output station, a plurality of actuating means disposed in the path of the indicator means and each associated with a particular output station, a solenoid mechanically connected to the impeller to implement the movement thereof, and means connecting between the actuating means and the solenoid so that power flows to the solenoid in accordance with the contact between the indicator means and the actuating means.

3. Apparatus in accordance with claim 1 in which each transfer means comprises an impeller movable against an article to impel the article from the input conveyor to the output station, the impeller having a first pair of driven rollers, a second pair of rollers, a first arm supporting the first roller pair, a second arm supporting the second roller pair, means journalling each support arm, said means including a source of motion for the driven rollers, and additional means linking the support arms of the roller pairs with respect to their respective journals so that activation of the solenoid moves each roller pair into simultaneous contact with an article on the input conveyor.

4. Apparatus in accordance with claim 3 in which the means journalling the support arms for the first and the second roller pairs is a driven shaft having means associated therewith for driving the roller pairs.

5. Apparatus comprising an input conveyor having a conveying surface lying in a plane, a plurality of indicator arms pivotally secured at one end to the conveyor at spaced points therealong, a selector housing, manually operable control buttons extending from the housing, a plurality of cam rods extending from the housing, the cam rods being spaced at different distances from the plane of the conveyor surface, and mechanical linkage between each control button and a cam rod adapted to impel a control rod into the path of an indicator arm when a control button is operated, whereby the selected indicator arm is rotated about its pivoted end by varying amounts depending on the spacing of the extended control rod from the plane of the conveyor surface.

6. Apparatus in accordance with claim 5 in which the mechanical linkage between the control button and the cam rods comprises a plurality of vertical control rods, a plurality of L-shaped lever arms each pivotally mounted with respect to a control rod, one end of each lever arm being linked to a control rod, a cam rod slidable through the selector housing, means linking the second end of each L-shaped lever arm to a cam rod, a plurality of compression springs each about a cam rod and adapted to oppose outward motion of the cam rod through the selector housing, a plurality of notches in the vertical control rod, and means operable to mesh with the notches to maintain the position of the cam rod with respect to its protrusion through the selector housing.

7. Apparatus in accordance with claim 6 in which the mechanical linkage between the control buttons and the cam rods comprises a rotatable shaft extending between the rows of control buttons and cam rods, a vertically extending link pivotally mounted about the rotatable shaft, one such linkage extending between each control button and cam rod and being pivotally fastened at one of its ends to each, the rotatable shaft being located with respect to the control buttons and cam rods so that inward motion of a control button moves the link to result in outward motion of a cam rod, a locking panel operable to preclude motion of all of the links, a pair of annular notches in each cam rod in that portion of the rod within the selector housing, and a latch panel operable to reside intermittently in an annular notch to latch a cam rod in outthrust position when the control button associated with the cam rod is moved inwardly with respect to the selector housing.

8. Conveyor apparatus comprising a continuously movable conveyor, a plurality of pivoted arms spaced along the conveyor and movable in synchronism therewith, a plurality of cam rods selectively movable into the path of said arms, the cam rods each having a different spacing from the path of the pivot parts of the arms, means for holding the arms in any relatively angular position, whereby an arm passing a selected cam rod is rotated by the cam rod to an angular orientation determined by the spacing of the cam rod from the pivot point of the arm, a plurality of transfer stations positioned along the conveyor, means at each transfer station for deflecting articles off the conveyor when actuated, and means associated with each transfer station for sensing the station orientation of the arms as they move past the transfer stations and actuating the transfer means in response only to a predetermined orientation of an arm.

9. Apparatus as defined in claim 8 further including stop means for holding an article in a fixed position, and means for releasing the stop means in response to an arm passing at a predetermined point when a cam rod has been selected, whereby the arm and released article move into the transfer stations in synchronism.

10. Apparatus as defined in claim 9 wherein said means for releasing the stop means includes a switch actuated by an article when it is in position against the stop means, a switch actuated by the cam rods when one of the cam rods is moved into the path of said arms, a switch actuated by the passing of an arm into the region of the cam rods, and a solenoid for releasing the stop means, said switches when all are actuated completing a circuit through the solenoid.

References Cited in the file of this patent

UNITED STATES PATENTS

| | | |
|---|---|---|
| 1,324,247 | Gehring | Dec. 9, 1919 |
| 1,442,126 | Cadden | Jan. 16, 1923 |
| 2,812,079 | Carnine | Nov. 5, 1957 |